United States Patent
Koopman, Jr. et al.

[11] Patent Number: 5,783,994
[45] Date of Patent: Jul. 21, 1998

[54] VEHICLE SECURITY SYSTEM WITH COMBINED KEY FOB AND KEYPAD ANTI-DRIVEAWAY PROTECTION

[75] Inventors: Philip J. Koopman, Jr., Pittsburgh, Pa.; Roger D. Carroll, Burnsville, Minn.; Richard Grzybowski, Plantsville; Paul Marshall, Avon, both of Conn.

[73] Assignee: United Technologies Automotive, Inc., Dearborn, Mich.

[21] Appl. No.: 835,383

[22] Filed: Apr. 7, 1997

[51] Int. Cl.$^6$ ........................ G08B 1/08
[52] U.S. Cl. ............... 340/539; 340/425.5; 340/426; 340/825.32; 307/10.4
[58] Field of Search ............... 340/825.31, 825.32, 340/825.69, 825.72, 426, 425.5, 428, 457.2, 528; 307/10.2, 10.3, 10.4; 180/287; 20/256, 257

[56] References Cited

U.S. PATENT DOCUMENTS

| | | | |
|---|---|---|---|
| 4,737,789 | 4/1988 | Nysen | 342/51 |
| 5,278,547 | 1/1994 | Suman et al. | 340/825.32 |
| 5,396,216 | 3/1995 | Morgan | 340/426 |

*Primary Examiner*—Jeffery A. Hofsass
*Assistant Examiner*—Daryl C. Pope
*Attorney, Agent, or Firm*—Howard & Howard

[57] ABSTRACT

A vehicle security system combines anti-driveaway protection with vehicle entry signalling. Either a remote signalling device is used to generate a remote signal or an input device, mounted on the vehicle, is used to generate an access signal. An entry control unit receives and interprets the remote signal or the access signal and unlocks the vehicle doors when appropriate. At the same time, the entry control unit communicates with an engine controller that an appropriate signal has been received. In response, the engine controller enables the vehicle engine to be started so that the vehicle can be driven in a conventional manner.

17 Claims, 1 Drawing Sheet

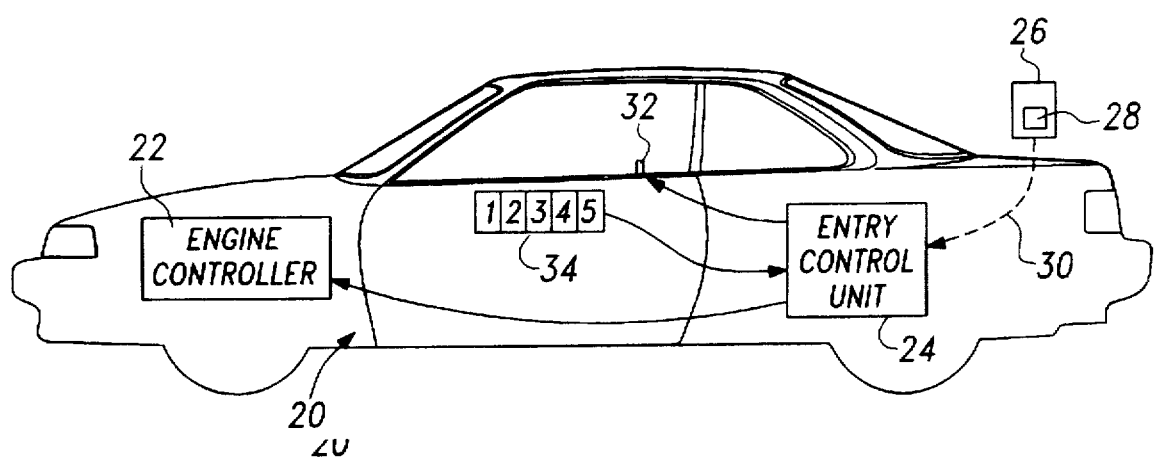

VEHICLE SECURITY SYSTEM WITH COMBINED KEY FOB AND KEYPAD ANTI-DRIVEAWAY PROTECTION

BACKGROUND OF THE INVENTION

This invention generally relates to vehicle security systems. More particularly, this invention relates to a system requiring a unique access signal from a remote signalling device or an input device mounted on a vehicle before the vehicle engine will be activated.

Vehicle theft is currently a considerable problem. A variety of attempts have been made to reduce the possibility for a vehicle to be stolen. One proposal has been to implement a system that prevents a potential thief from "hot-wiring" a vehicle or otherwise driving away the vehicle without having a legitimate ignition key. One currently used system includes placing a signalling device on an ignition key that provides an indication to an engine controller that a legitimate ignition key is in use. While such systems are useful, they are not without disadvantages.

Anti-driveaway systems that include a radio frequency transponder on an ignition key require a special purpose antenna located in the steering column of the vehicle. The special purpose antenna is used to receive an authentication code from the transponder in the key. The antenna also typically serves the purpose of uplinking power to the transponder on the key. The antenna itself introduces additional hardware and expense to the vehicle. Another problem associated with such systems is the difficulty of locating the antenna within a steering column, where space is typically at a premium.

A further difficulty is that the transponder mounted on the key introduces further additional expense. Moreover, the transponder must have some sort of non-volatile memory to implement a rolling code that is useable with uplinked radio frequency power so that it can function in a desired manner. Providing such a non-volatile memory in a transponder on a key becomes technically challenging, especially in view of the desire to keep expense at a minimum.

This invention addresses the need to provide an anti-driveaway protection feature without requiring additional circuitry or hardware such as an antenna in the steering column and a transponder on an ignition key. This invention provides the further advantage of creating the possibility for eliminating hardware associated with conventional mechanical door locks.

SUMMARY OF THE INVENTION

In general terms, this invention is a vehicle security system that utilizes a signal from a remote signalling device or an input device mounted on a vehicle to control access to the vehicle and the ability to start the vehicle engine. A system designed according to this invention includes a controller that controls an operation condition of the engine and a lock condition of a door lock associated with the vehicle. The controller includes a receiver portion. A remote signalling device can be used to generate a remote signal that is received by the controller receiver portion. Additionally, an input device is supported on the vehicle and has a signal generating portion that can be used to generate an access signal that is also received by the controller receiver portion. The controller changes the lock condition of the door lock from a locked condition into an unlocked condition and the operation condition of the engine from an unusable condition into a usable condition when the controller receives either the remote signal from the remote signalling device or the access signal from the input device mounted on the vehicle.

In the preferred embodiment, the remote signalling device is a key fob having a manually actuatable switch for generating a radio frequency remote signal. The input device mounted on the vehicle preferably is a numeric keypad mounted on the exterior of the doors of the vehicle. A unique combination of the numeric keypads is used to generate the access signal that is then interpreted by the controller.

The various features and advantages of this invention will become apparent to those skilled in the art from the following detailed description of the presently preferred embodiment. The drawing that accompanies the detailed description is appropriately described as follows.

BRIEF DESCRIPTION OF THE DRAWING

The FIGURE schematically illustrates a vehicle security system designed according to this invention.

DETAILED DESCRIPTION OF THE PREFERRED EMBODIMENT

The FIGURE diagrammatically illustrates a vehicle 20 that includes an electronic engine controller 22 and an electronic entry control unit 24. The controller 22 and the entry control unit 24 are schematically illustrated as discrete components for illustration and discussion purposes only. Given this specification, one skilled in the art will realize that the engine controller 22 and the entry control unit 24 can be achieved through a single microprocessor, other dedicated circuitry and/or custom designed software.

A remote signalling device 26 preferably is a hand-held key fob. The remote signalling device 26 includes a mechanically actuatable switch 28 that, when actuated, causes a signal 30 to be generated that is received and interpreted by the entry control unit 24. The signal 30 preferably is a radio frequency signal. Those skilled in the art will realize that other types of short range signals can be implemented such as infrared or ultrasound.

Upon receiving an appropriate signal from the remote signalling device 26, the entry control unit 24 changes the vehicle locking device 32 from a locked condition into an unlocked condition. The vehicle locking device 32 is schematically illustrated and can include any conventional locking mechanism that is at least partially electronically controllable.

At the same time that the entry control unit 24 determines it receives an appropriate remote signal 30, it signals to the engine controller 22 that an appropriate signal has been received. At that point, the engine controller 22 enables the engine to be started. In other words, the engine controller 22 is responsible for the operation condition of the engine. The engine is placed into an unusable condition, where the engine cannot be started, or into a useable condition, where the engine can be started and the vehicle driven in a conventional fashion. The engine controller 22 is responsible for maintaining the operation condition of the engine.

For those instances where a remote signalling device should fail, this invention includes an input device 34 mounted on the vehicle. In the preferred embodiment, the input device 34 comprises a numerical keypad mounted on the exterior of at least one door of the vehicle. The vehicle owner can manipulate the numeric keypad in a pre-selected order to generate an access signal that corresponds to a personal identification number of the vehicle owner. This access signal is communicated to the entry control unit 24, which then unlocks the locking device 32. At the same time, the engine control unit 24 signals to the engine controller 22 that legitimate vehicle access has been accomplished and that the engine should be placed into a useable operation condition so that the vehicle can be started and driven as desired. The input device 34 is useful in situations where the remote signalling device 26 has failed because of a dead battery or in the undesirable event that the remote signalling device 26 was locked inside the vehicle.

The remote signalling device 26 preferably generates a signal that is an encrypted rolling code having a unidirectional transmission. In the preferred embodiment, the access signal generated through the input device 34 need not match the remote signal 30 from the remote signalling device 26. The entry control unit 24 preferably is programmed to recognize either signal.

A system designed according to this invention preferably is used in the following general manner. The vehicle owner unlocks the vehicle doors using the remote signalling device 26. The engine controller 22 then places the engine into a useable operation condition. Alternatively, the vehicle owner generates an access signal using the input device 34. The vehicle operator then inserts an ignition key, in a traditional fashion, and utilizes the vehicle as desired. The engine controller 22 maintains the engine in a useable operation condition until after the ignition key is later removed, regardless of the door lock positions.

In the preferred embodiment, when the doors of the vehicle remain closed for more than a preselected period of time (30 seconds, for example), then the door locks 32 are returned to a locked condition and the engine controller 22 disables the engine, provided that there is no key in the ignition. Similarly, when the ignition key is removed, the doors are locked and the engine is disabled after a preselected period of time. Replacing the key into the ignition before the designated period of time elapses, however, allows the driver to utilize the vehicle. Having such a timing sequence for re-locking the doors and disabling the engine is most preferred. It ensures that the engine is not left in an enabled or useable operation condition when the vehicle owner does not desire to drive the vehicle. In the event that the engine controller inappropriately disables the engine, in the preferred embodiment, the vehicle owner simply generates a new remote signal or access signal as described above.

A number of advantages are provided by a system designed according to this invention. The combination of the input device 34 and the remote signalling device 26 provides the vehicle owner the ability to legitimately use the vehicle regardless of what happens to the remote signalling device 26. A system designed according to this invention also eliminates the need for a transponder on the ignition key or the remote signalling device 26. Further, cost savings are achieved by eliminating an antenna in the steering column and potentially eliminating the hardware needed for conventional mechanical lock cylinders.

The ability to unlock the vehicle using the input device 34 may not always be preferred over a mechanical key. The use of a remote signalling device 26 in almost all circumstances however, will be preferred over a mechanical key. Therefore, in a system designed according to this invention, conventional mechanical lock systems can be replaced with an electro-mechanical latch, which reduces the ability for a potential thief to manipulate the door locks and provides the additional benefit of having "hands-off" door opening capabilities.

The preceding description is exemplary rather than limiting in nature. Variations and modifications to the disclosed embodiment may become apparent to those skilled in the art that do not necessarily depart from the purview and spirit of this invention. Accordingly, the following claims must be studied to determine the scope of legal protection afforded this invention.

What is claimed is:

1. A vehicle security system, comprising:
    a controller that controls an operation condition of an engine associated with the vehicle and a lock condition of a door lock associated with the vehicle, said controller including a receiver portion;
    an ignition key slot for receiving a key and being useable to start the engine;
    a remote signalling device that selectively generates a remote signal that is received by said controller receiver portion; and
    an input device supported on the vehicle and having a signal generating portion that selectively generates an access signal that is received by said controller receiver portion;
    wherein said controller
        changes said lock condition of said door lock from a lock condition into an unlocked condition and said operation condition of said engine from an unusable condition into a useable condition upon receiving either of said remote signal or said access signal,
        determines whether a key has been inserted into said ignition slot, and
        changes said engine operation condition back to the unusable condition when said key is not inserted into said ignition slot within a preselected time after said controller changed said engine operation condition to the useable condition.

2. The system of claim 1, wherein said controller comprises a microprocessor.

3. The system of claim 1, wherein said remote signalling device comprises a hand-held fob having a transmitter portion that generates said remote signal and a manually actuatable switch for activating said transmitter portion.

4. The system of claim 1, wherein said input device comprises a keypad supported on an exterior portion of the vehicle.

5. The system of claim 1, wherein said input device is coupled directly to said controller and said remote signal comprises a radio frequency signal.

6. The system of claim 1, wherein said doorlock comprises an electro-mechanical latch.

7. The system of claim 1, wherein said controller further changes said lock condition back to the locked condition when a door of a vehicle is not opened within a preselected time after said controller changed said lock condition into the unlocked condition.

8. A method of controlling a vehicle security system having a remote signalling device and an input device supported on the vehicle, comprising the steps of:
    (A) defining a first condition where a remote signal has been generated by the remote signalling device;
    (B) defining a second condition where an access signal has been generated by the input device;
    (C) determining if the first condition from step (A) or the second condition from step (B) exists;
    (D) placing a vehicle entry subsystem into an unlocked condition and placing a vehicle engine into a usable operation condition when either the first or second condition exists;
    (E) defining a third condition where an ignition key has been placed into a key slot;

(F) determining whether the third condition exists within a preselected time after performing step (D); and (G) placing the vehicle engine into an unusable operation condition when the third condition does not exist within the preselected time.

9. The method of claim 8, further comprising the steps of determining the ignition key is used to start the vehicle engine and maintaining the engine in the useable operation condition until the ignition key is subsequently removed from the key slot.

10. The method of claim 8, wherein step (D) is performed by changing a condition of the vehicle entry subsystem from a locked condition to the unlocked condition and changing the operation condition of the vehicle engine from a non-usable condition to the useable operation condition.

11. The method of claim 8, further comprising the steps of determining a start time when said first or second condition first exists;

defining a fourth condition where a door associated with the vehicle has been opened subsequent to said start time;

determining whether the fourth condition exists within a preselected period from the start time; and placing the vehicle entry subsystem into a locked condition when the fourth condition does not exist within the preselected period.

12. The method of claim 11, further comprising placing the vehicle engine into an unusable condition when the fourth condition does not exist within the preselected period.

13. The method of claim 8, further comprising the steps of defining a turn off condition where the ignition key is removed from the slot subsequent to being inserted into the slot;

determining whether the turn off condition exists for a preselected period; and placing the vehicle entry subsystem into a locked condition and the vehicle engine into an unusable condition when the turn off condition exists for at least the preselected period.

14. The method of claim 8, further comprising the steps of determining when the vehicle engine operation condition has changed into an unusable condition subsequent to step (D) being performed;

generating a remote signal using the remote signalling device from step (A);

determining if the first condition exists; and placing the vehicle engine into the useable operation condition when the first condition exists.

15. The method of claim 14, further comprising the steps of generating an access signal using the input device from step (B), reperforming step (C) and then reperforming step (D).

16. A method of controlling a vehicle security system having a remote signalling device and an input device supported on the vehicle, comprising the steps of:

(A) defining a first condition where a remote signal has been generated by the remote signalling device;

(B) defining a second condition where an access signal has been generated by the input device;

(C) determining if the first condition from step (A) exists or the second condition from step (B) exists;

(D) placing a vehicle entry subsystem into an unlocked condition and placing a vehicle engine into a useable operation condition when either the first or second condition exists;

(E) defining a third condition where a door of the vehicle has been opened subsequent to step (D) being performed;

(F) defining a fourth condition where an ignition key has been placed into a key slot subsequent to step (D) being performed;

(G) determining whether the third or fourth condition exists; and (H) placing the vehicle engine into an unusable operation condition when either the third or fourth condition does not exist within a preselected time after performing step (D).

17. The method of claim 16, further comprising the step of placing the vehicle entry subsystem into a locked condition when the third condition does not exist within a preselected time after performing step (D).

\* \* \* \* \*